US 12,037,103 B2

(12) United States Patent
McKay

(10) Patent No.: US 12,037,103 B2
(45) Date of Patent: Jul. 16, 2024

(54) ACTUATION SYSTEM

(71) Applicant: Goodrich Actuation Systems Limited, West Midlands (GB)

(72) Inventor: Richard John McKay, Much Wenlock (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 249 days.

(21) Appl. No.: 16/721,182

(22) Filed: Dec. 19, 2019

(65) Prior Publication Data
US 2021/0086890 A1 Mar. 25, 2021

(30) Foreign Application Priority Data

Sep. 20, 2019 (EP) .................................... 19198749

(51) Int. Cl.
*B64C 13/50* (2006.01)
*B64C 9/26* (2006.01)
*F16H 61/12* (2010.01)

(52) U.S. Cl.
CPC .............. *B64C 13/505* (2018.01); *B64C 9/26* (2013.01); *B64C 13/506* (2018.01); *F16H 61/12* (2013.01);
(Continued)

(58) Field of Classification Search
CPC ......... B64C 13/24; B64C 13/28; B64C 13/38; B64C 13/40; B64C 13/42; B64C 13/44;
(Continued)

(56) References Cited

U.S. PATENT DOCUMENTS 2,465,601 A * 3/1949 Ochtman ................ B64C 13/24
192/142 R
2,476,584 A * 7/1949 Clark ...................... B64C 13/24
192/14
(Continued)

FOREIGN PATENT DOCUMENTS

DE 102017111553 A1 1/2018
EP 2695810 A1 * 2/2014 ............. B64C 13/34
(Continued)

OTHER PUBLICATIONS

European Search Report for Application No. 19198749.4, dated Mar. 19, 2020, 7 pages.

*Primary Examiner* — Joshua J Michener
*Assistant Examiner* — Ryan Andrew Yankey
(74) *Attorney, Agent, or Firm* — CANTOR COLBURN LLP

(57) ABSTRACT

An actuation system comprises a plurality of actuators, a common power drive unit for driving the actuators and a transmission line transmitting drive from the common drive unit to the plurality of actuators. A clutch is arranged in the transmission line between the power drive unit and the plurality of actuators for selectively disconnecting the power drive unit from the plurality of actuators. At least one sensor is provided for sensing an abnormal load condition in the actuation system. The at least one sensor is operatively coupled to a clutch control which is configured such that when the at least one sensor senses an abnormal load condition, the clutch control is operative to disengage the clutch so as to disconnect the power drive unit from the plurality of actuators. A brake is operative to brake the actuators upon disengagement of the clutch.

10 Claims, 4 Drawing Sheets

(52) U.S. Cl.
CPC ............... *F16H 2061/124* (2013.01); *F16H 2061/1288* (2013.01)

(58) Field of Classification Search
CPC ..... B64C 13/50; B64C 13/341; B64C 13/505; B64C 13/506; F16H 2061/1288
See application file for complete search history.

(56) References Cited

U.S. PATENT DOCUMENTS

| | | | |
|---|---|---|---|
| 3,198,302 A * | 8/1965 | Janzen | F16D 67/06 |
| | | | 192/55.3 |
| 3,702,127 A * | 11/1972 | Yokoyama | D05B 69/18 |
| | | | 192/18 B |
| 8,020,806 B2 | 9/2011 | Hauber et al. | |
| 8,373,376 B2 | 2/2013 | Hauzenberger et al. | |
| 9,434,469 B2 | 9/2016 | Zantz et al. | |
| 9,483,057 B2 | 11/2016 | Dorr et al. | |
| 9,868,522 B2 * | 1/2018 | Griffith | B64C 13/343 |
| 10,179,643 B2 * | 1/2019 | Nfonguem | F16D 37/02 |
| 10,883,554 B2 * | 1/2021 | Kracke | F16D 41/105 |
| 11,174,006 B2 * | 11/2021 | Tzabari | B64C 13/503 |
| 11,498,658 B2 * | 11/2022 | Thomas | B64C 9/02 |
| 11,884,380 B2 * | 1/2024 | Mitchell, III | B64C 13/38 |
| 2004/0251382 A1 | 12/2004 | Schievelbusch | |
| 2005/0029407 A1 * | 2/2005 | Pohl | B64C 13/24 |
| | | | 244/221 |
| 2013/0181089 A1 | 7/2013 | Recksiek et al. | |
| 2016/0176539 A1 * | 6/2016 | Van Bruggen | B64D 45/00 |
| | | | 701/33.9 |
| 2018/0002028 A1 * | 1/2018 | Polcuch | F15B 11/205 |
| 2019/0063511 A1 * | 2/2019 | Kracke | F16D 41/069 |
| 2019/0152583 A1 * | 5/2019 | Harrington | B64C 13/34 |
| 2020/0055590 A1 * | 2/2020 | Morgan | B64C 13/506 |

FOREIGN PATENT DOCUMENTS

| | | | | |
|---|---|---|---|---|
| EP | 3489135 A1 | | 5/2019 | |
| EP | 3653493 B1 * | | 1/2023 | B64C 13/02 |

* cited by examiner

ACTUATION SYSTEM

FOREIGN PRIORITY

This application claims priority to European Patent Application No. 19198749.4 filed Sep. 20, 2019, the entire contents of which is incorporated herein by reference.

TECHNICAL FIELD

The present disclosure relates to actuation systems and in particular, but not exclusively, to actuation systems as may be used in aircraft.

BACKGROUND

Aircraft use actuation systems in a wide range of applications. In particular, actuators may be used to operate movable surfaces of the aircraft, for example wing flaps and wing slats, for example in high lift systems.

Typically, a plurality of movable surfaces are provided on each wing of the aircraft, each surface being moved by one or more actuators, for example rotary actuators or ballscrews.

The actuators are driven by a common power drive unit, for example an electric motor which produces a rotary output. That output is transmitted to the actuators via a power transmission line which typically comprises a plurality of coupled drive shafts and which links the actuators together so as to ensure synchronous operation of the actuators and movement of the movable surfaces.

A problem that may arise in such systems is that a part of the actuation system may jam in use. For example, one of the movable surfaces or actuators may jam. When that occurs, the entire torque of the system may feed into the jammed component leading to excessive loads in the system. This means that in the absence of some mitigation, the relevant structure would have to be sized to resist such loading. This will result in weight penalties on the aircraft, which is undesirable.

SUMMARY

Form a first aspect, the disclosure provides an actuation system that comprises a plurality of actuators and a common power drive unit for driving the actuators. A transmission line transmits drive from the common drive unit to the plurality of actuators. A clutch is arranged in the transmission line between the power drive unit and the plurality of actuators for selectively disconnecting the power drive unit from the plurality of actuators. At least one sensor is provided for sensing an abnormal load condition in the actuation system. The at least one sensor is operatively coupled to a clutch control that is configured such that when the at least one sensor senses an abnormal load condition, the clutch control is operative to disengage the clutch so as to disconnect the power drive unit from the plurality of actuators. A brake is operative to brake the actuators upon disengagement of the clutch.

In accordance with the disclosure, therefore, a clutch disengages the power drive unit from the actuators upon sensing of an abnormal load condition. This provides a rapid decoupling of the drive, preventing damage to the system. The system is further protected by the brake which brakes the actuators and thereby prevents uncontrolled movement of the actuators.

The abnormal load condition may, for example, be a jam condition in the actuation system.

The at least one sensor may be configured to sense one or more of: a system load, a system torque, a system speed and a system position.

At least one sensor may be associated with each actuator.

The at least one sensor may be configured to sense at least one of an actuator load, actuator torque, actuator speed or actuator position.

In certain embodiments, the clutch may comprise the brake, the brake thereby automatically operating upon disengagement of the clutch. In alternative embodiments, however, a separate brake may be provided.

In various embodiments, the clutch control may further be configured to actuate the brake upon the at least one sensor sensing the abnormal load condition.

The disclosure also provides an aircraft actuation system comprising an actuation system in accordance with the disclosure and a plurality of movable surfaces, the movable surfaces being moved by the plurality of actuators.

Respective movable surfaces may be arranged on respective wings of the aircraft with respective sections of the transmission line connected between the power drive unit and the actuators in each wing. A brake may be provided on each section of the transmission line.

The brake may be a wing tip brake also operable in response to detection by asymmetry detectors on each transmission line section of asymmetrical deployment of the movable surfaces.

The disclosure also provides a method of preventing excessive loads in an actuation system which comprises a plurality of actuators, a common power drive unit for driving the actuators and a transmission line transmitting drive from the power drive unit to the plurality of actuators. The method comprises sensing an abnormal load within the actuation system and in response to an abnormal load being sensed, disconnecting the power drive unit from the plurality of actuators and applying a braking force to the disconnected actuators.

The disconnection may be effected by operation of a clutch arranged between the power drive unit and the plurality of actuators.

The method may comprise sensing a parameter indicative of system load, for example a system load, a system torque, a system speed or a system position and determining whether the sensed parameter indicates an abnormal load.

The actuation system may be provided in an aircraft comprising movable surfaces arranged on respective wings of the aircraft with respective actuators operating the movable surfaces. The braking may be effected by means of respective wing tip brakes associated with the actuators of each wing.

In an alternative arrangement, braking is effected by means of a brake integrated into a or the clutch arranged between the power drive unit and the plurality of actuators.

BRIEF DESCRIPTION OF THE DRAWINGS

Some embodiments of the disclosure will now be described by way of example only with reference to the accompanying drawings in which.

DETAILED DESCRIPTION

Figure 1:
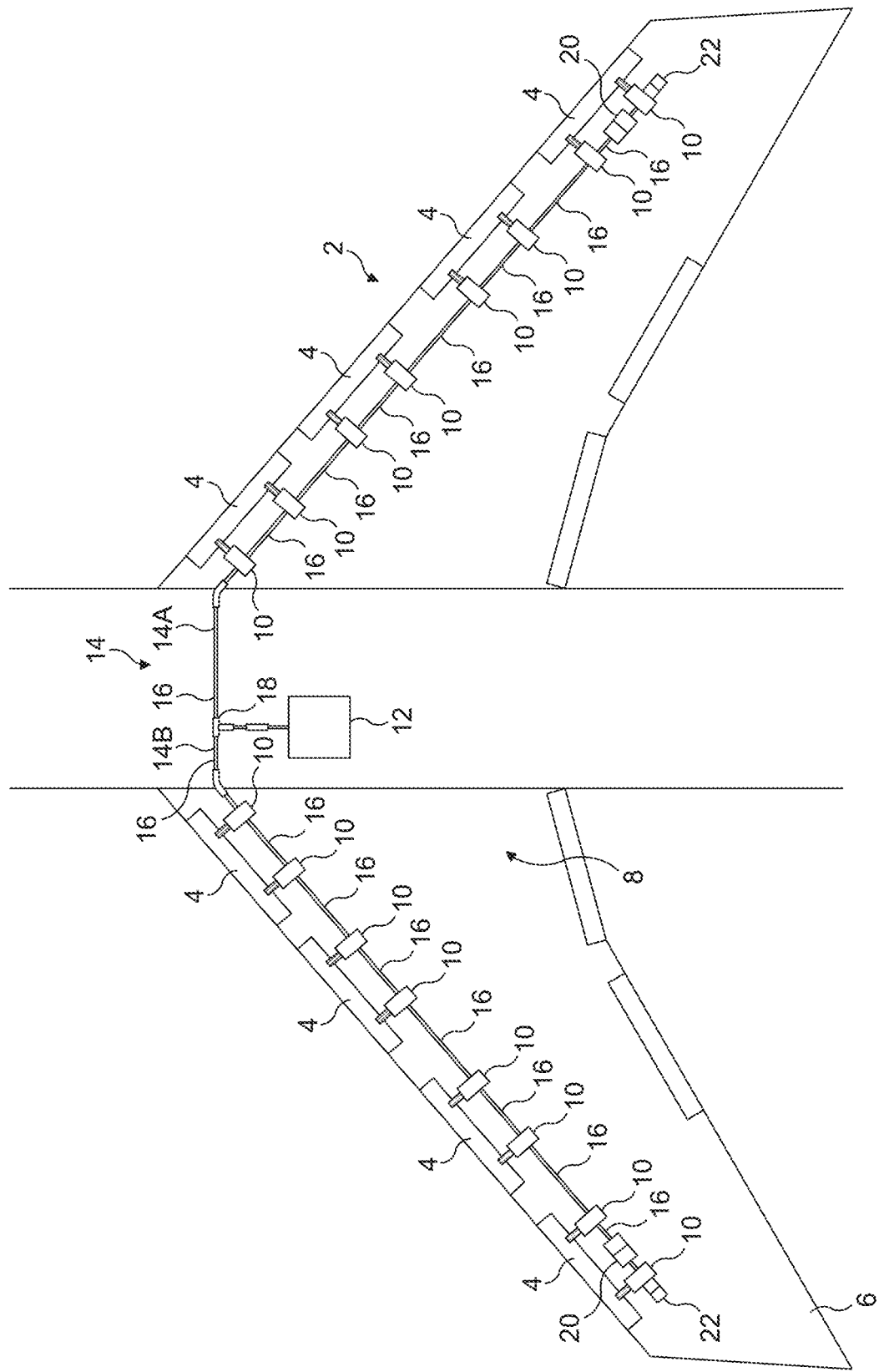
FIG. 1 illustrates schematically an aircraft system comprising an actuation system.

FIG. 1 illustrates an aircraft comprising a plurality of leading edge slats 4 on each wing 6 of the aircraft 2. The slats 4 are selectively deployed and retracted by an actuation system 8. The actuation system 8 comprises rotary actuators 10, for example ballscrew actuators 10. Each actuator 10 is powered by a rotary drive from a common power drive unit 12 such as an electric motor. Drive is transmitted from the power drive unit 12 via a transmission line 14, which comprises series of power transmission shafts 16, which connect the actuators 10 in series. The transmission shafts 16 may be joined by suitable couplings, not shown. The transmission line 14 is split into two sections 14A, 14B, extending along a respective wing 6. A gearbox 18 may be provided to split the transmission line 14 into the two sections 14A, 14B.

A brake 20 is provided in each transmission line section 14A, 14B. This brake is typically towards the end of the transmission line section 14A, 14B, normally in the transmission line between the second from last and last actuator 10 on each wing 6 and is known as a wing tip brake. An asymmetry sensor 22, which detects differences in position between the transmission line sections 14A, 14 B, is also provided on each transmission line section 14A, 14B. Asymmetrical operation of the slats 4 on the wings 6 is undesirable as it will create an asymmetrical aerodynamic effect, which is highly undesirable. Upon a difference being detected, the asymmetry sensor 22 will operate to cut or reduce power to the drive unit 12 and trigger the wing tip brake 20 so as to brake the transmission line and prevent further operation of the actuators 8.

As discussed above, the actuators 10 deploy and retract the slats 4. Should one of the actuators 10 or slats 4 jam, then potentially the entire output of the power drive unit 12 may be input into that actuator 10 or slat 4 leading to very high loads. The actuator 10 or slat 4 and the surrounding aircraft structure would then have to be sized to react those loads, which may result in additional weight, which is undesirable. Some systems incorporate mechanical torque limiters with each of the actuators 10 which will limit the torque transmitted into the actuator 10 when a jam occurs. While effective, these torque limiters introduce low temperature drag into the system and may therefore need extra power from the drive unit 12 to operate the system. Mechanical torque limiters may also have limited accuracy and may therefore be set to operate at high torques resulting in increased aircraft system and structural weight.

Figure 2:
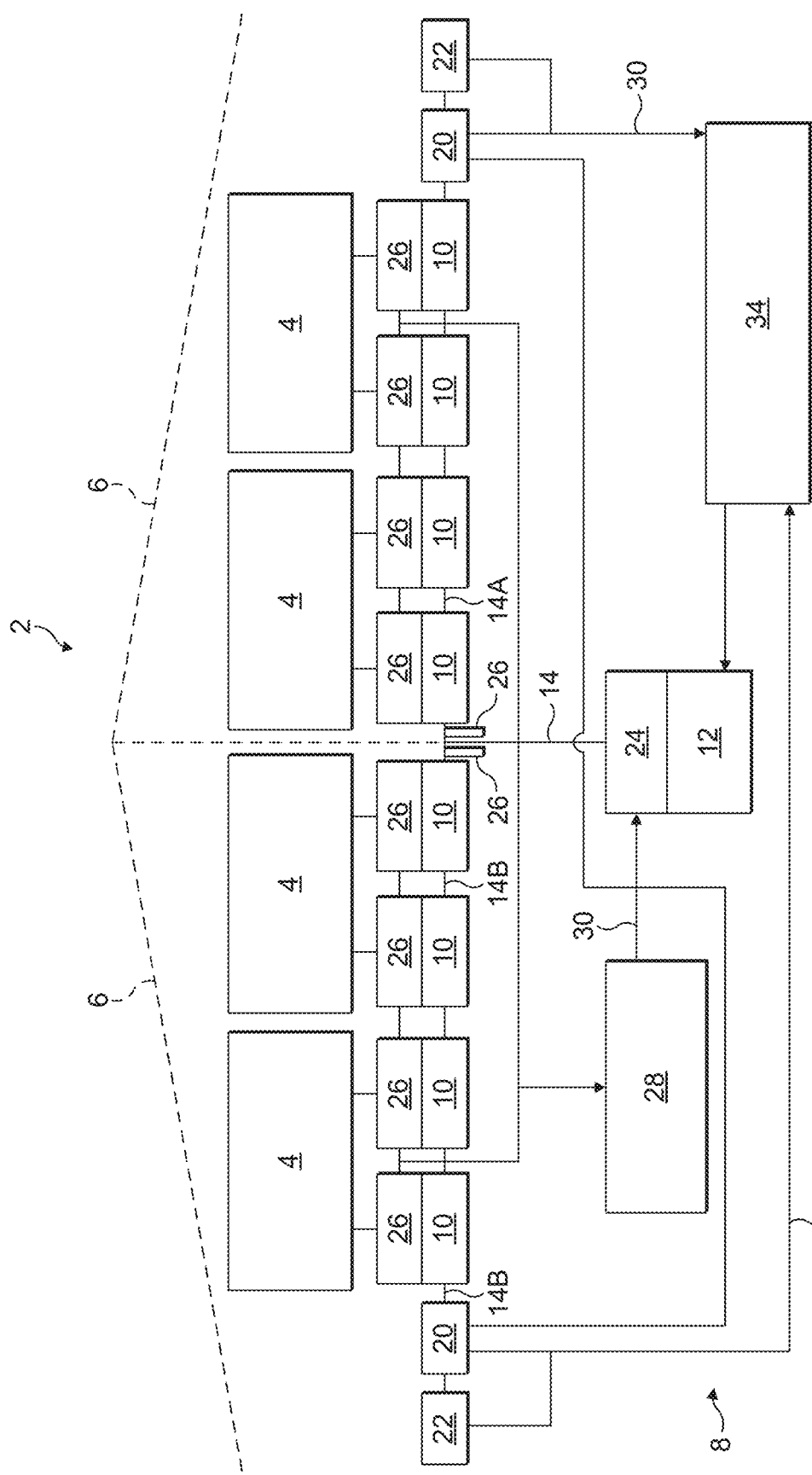
FIG. 2 illustrates schematically an actuation system in accordance with the disclosure.

FIG. 2 illustrates an actuation system 8 in accordance with the disclosure which mitigates the effects of system overloading in a different manner.

The actuation system 8 of FIG. 2 comprises a plurality of actuators 10, a common power drive unit 12 for driving the actuators 10 and a transmission line 14 transmitting drive from the common power drive unit 12 to the plurality of actuators 10, as described above. The system also includes a wing tip brake 20 and asymmetry detector 22 on each transmission line section 14A, 14B as described above.

In the system according to the disclosure, however, a clutch 24 is arranged in the transmission line 14 between the power drive unit 12 and the plurality of actuators 10 for selectively disconnecting the power drive unit 12 from the plurality of actuators 10, as will be described further below. The clutch 24 is arranged in the transmission line 14 at a point upstream of the splitting of the transmission line 14 into its two sections 14A, 14B such that on operation of the clutch 24 the power is disconnected to all the actuators 10.

In normal operation, the clutch 24 will transmit power into the transmission line 14 and thus into the actuators 10. However, in the event of an abnormal load condition in the system, for example a jam occurring in an actuator 10 or slat 4, the clutch 22 will be disengaged from the power drive unit 10 so as to disconnect the power drive unit from the actuators, as will be described below.

To effect this disconnection, a plurality of sensors 26 is provided. At least one sensor 26 may be associated with each actuator 10. The sensor may be arranged on the input or the output of the actuator. It may however be advantageous to place the sensor on the output, as this is closer to the surface being controlled. Sensors 26 may also be positioned at different locations in the transmission line 14. For example, sensors 26 may be positioned on the transmission line sections 14A, 14B. The sensors 26 sense a parameter that is indicative of an abnormal load condition occurring at an actuator 10 as may occur when an actuator 10 or the slat 4, which it moves, jams. In those circumstances, the load applied to the actuator 10 will rise abnormally, this being sensed by the sensor 26.

The sensor 26 may sense any parameter which is indicative of the abnormal load. Thus for example the sensor 24 may sense a system load, a system torque, a system speed and a system position. For example, the sensor 26 may sense an input torque or output torque in the actuator 10, a load in the actuator 10, a speed of the actuator 10, or an input or output position of the actuator 10. Measurement of a load, torque or speed may be particularly advantageous as providing a rapid indication of an abnormal condition.

The sensors 26 are connected to an electronic clutch control unit 28 that processes the sensor 26 signals and determine whether they are indicative of an abnormal load condition. If the clutch control unit 28 determines that an abnormal load condition exists, then it will operate to disengage the clutch 24 so as disconnect the power to the actuators 10, to prevent further load being applied to the system. The clutch control unit may, for example send a disconnect command 30 to the clutch 24, for example to a solenoid of the clutch 24.

While the drive to the actuators 10 may be disconnected by disengagement of the clutch 24, loads will still be present in the actuation system, for example due to aerodynamic loading of the slats 4 and inertia in the transmission line 14. To mitigate the effects of these loads, the actuation system 2 further comprises a brake that brakes the transmission line 14 and thus the actuators upon operation of the clutch 24.

In one embodiment, a dedicated brake may be provided, for example on each transmission line section 14A, 14B. In one embodiment, however, the clutch disconnection command 30 signal could also be used to initiate operation of the wing tip brakes 20 already present in the system and normally operable in response to the asymmetry detectors 22 detecting an asymmetrical operation of the slats 4. This avoids the need for additional brakes in the system, thereby avoiding a weight penalty associated with such.

Normally, and as known in the art, in such circumstances, in addition to operating the wing tip brakes 20, a signal 32 is sent to a power drive control unit 34 to stop or at least reduce the speed of the power drive unit 12. Operation of the wing tip brakes 20, or any other transmission line brake in a system of the disclosure, may also be used to control the power drive unit 12.

The embodiment described above is advantageous in that it provides for rapid disconnection of power to the actuators 10 and therefore limitation of abnormal loads in the actuators without the need for mechanical torque limiters. It also provides for rapid braking of the transmission line either by brakes 20 already present in the system, or by a dedicated brake.

The clutch 24 can be of any suitable construction and it may be provided in any suitable location in the transmission line 14. For example, it could be incorporated in an output of the power drive unit 12 or in an input to a gearbox 18 that splits the transmission line 14 into two sections 14A, 14B, or as a stand-alone unit mounted in the transmission line 14. It may comprise a solenoid or hydraulics for actuation for example.

Figure 3:
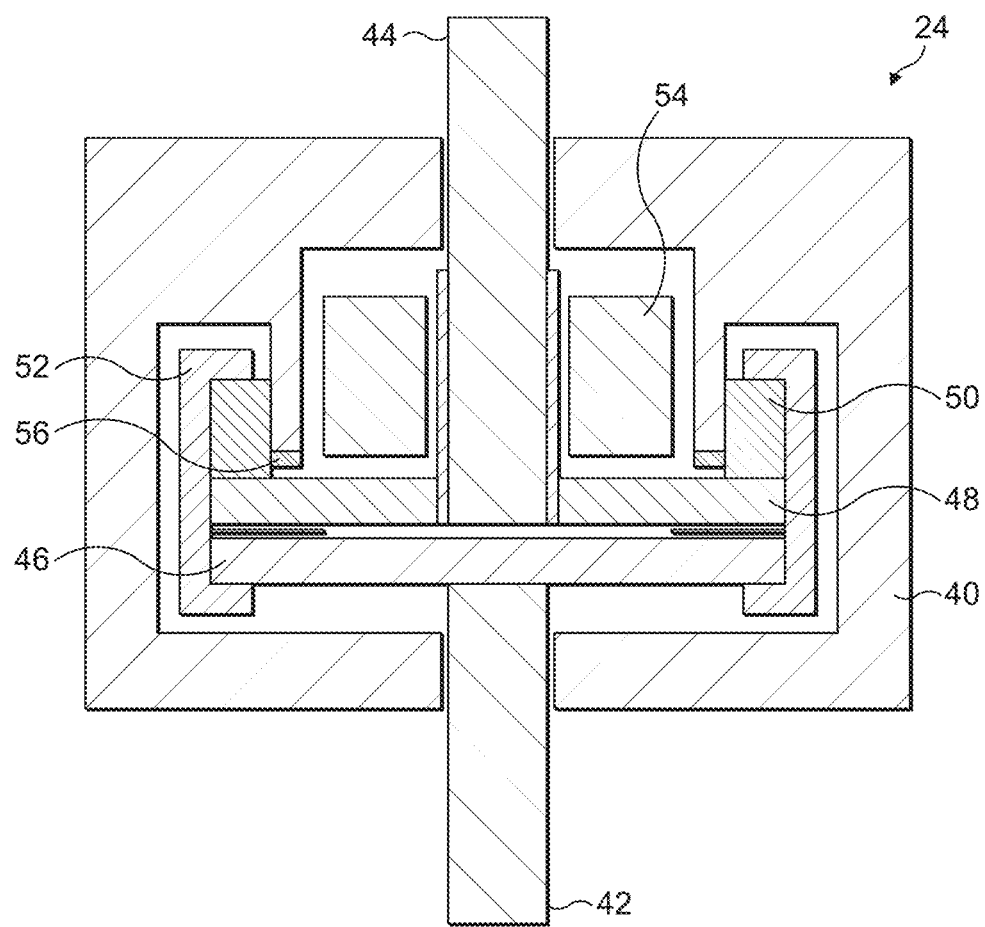
FIG. 3 illustrates schematically a clutch for use in an actuation system in accordance with the disclosure.

FIG. 3 illustrates a clutch 24 that may be used in a system of the disclosure.

The clutch 24 comprises a clutch housing 40, an input shaft 42 and an output shaft 44. Friction plates 46, 48 are coupled to the input shaft 42 and output shaft 44 respectively. The friction plates 46, 48 are biased into contact by a coil spring 50 received within a spring housing 52. The clutch further comprises a solenoid 54 which can be activated to disengage the clutch 24 by pulling the friction plate 48 coupled to the output shaft 44 away from the friction plate 46 coupled to the input shaft 42, in a conventional manner. The solenoid 54 could be replaced by a hydraulic system in other embodiments.

However, the clutch 24 further comprises a static friction plate or ring 56 with which the friction plate 48 coupled to the output shaft 44 will engage when the clutch 24 is disengaged. This will act to brake the transmission line 14 to which the output shaft 44 is coupled. Such a clutch may be advantageous as providing a compact braking arrangement.

As discussed above, an abnormal loading condition can be detected by the sensors 26. Various techniques may be employed, for example using a threshold exceedance method or by comparison with a system model predicting the behaviour of a healthy system.

Figure 4:
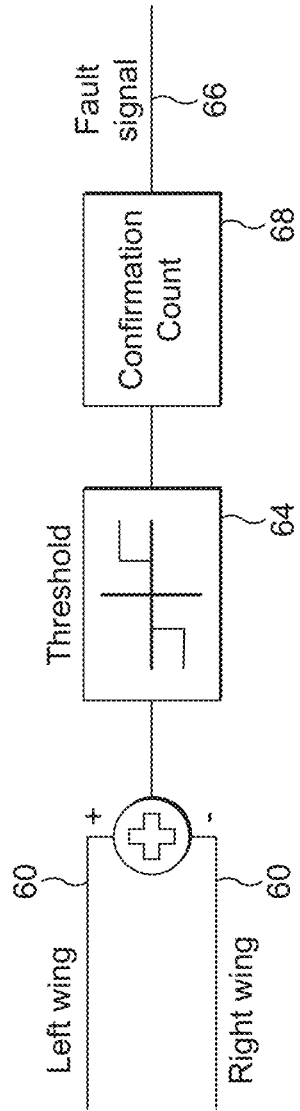
FIG. 4 illustrates a first example of abnormal load detection.

An example of the first of these techniques is illustrated in FIG. 4. In this embodiment, signals 60 from the sensors 26 in either wing 6 are compared against a predetermined threshold value in a step 64, and if a signal exceeds the threshold, a clutch disengagement signal 66 is produced. As illustrated, the system may comprise a confirmation count step 68 to confirm that the signal is a true signal, i.e. it persists for longer than a predetermined time period or counts, before the signal is passed to the clutch control 28 to disengage the clutch 24. This avoids the actuation system 8 from being shut down by brief spurious event.

Figure 5:
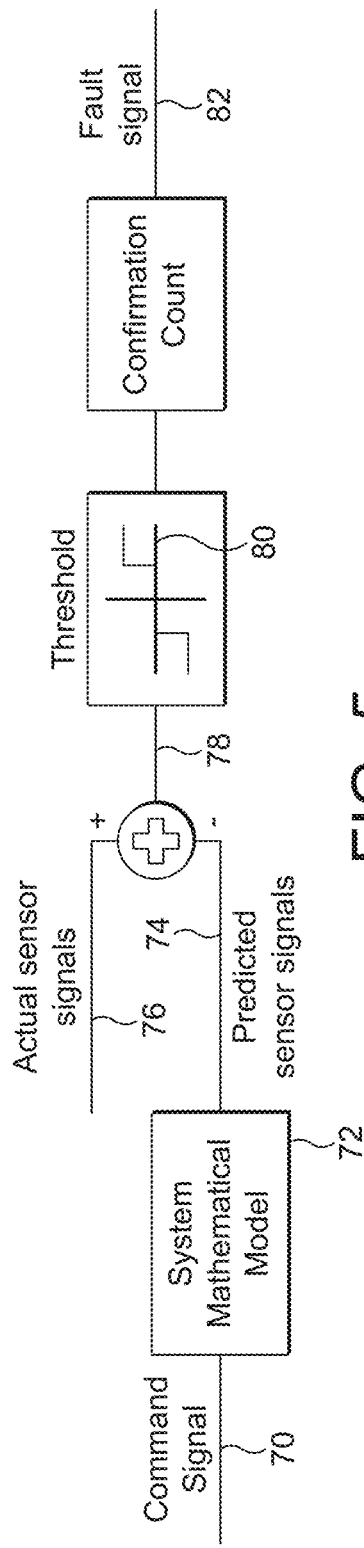
FIG. 5 illustrates a second example of abnormal load detection.

An example of the second of these techniques is illustrated in FIG. 5. In this embodiment, a command signal 70 is processed by a mathematical model 72 to predict a predicted sensor signal 74 that is then compared with the actual sensor signal 76 and if the difference 78 between the actual sensor measurement 76 and the predicted sensor measurement exceeds a predetermined threshold 70, a clutch disengagement signal 82 is produced.

Of course, these are merely examples of abnormal condition detection techniques and the skilled person will easily be able to implement other suitable techniques.

From the above it will be understood that the disclosure provides an electronic system for disengaging a power drive unit from a plurality of actuators to protect the actuation system from abnormal operating conditions, particularly jams. This obviates the need for mechanical torque limitation devices. It allows for rapid and simple disengagement of the power drive unit and further brakes the system so as to prevent further movement of the actuators.

While the disclosure has been described in the context of an aircraft slat system, it may equally be applied to other actuation systems both on aircraft and elsewhere (for example an aircraft flap).

Also, while the illustrated embodiment comprises a common power drive unit 12 for driving the actuators 10 on both wings 6 of the aircraft, in other embodiments a respective power drive unit could be used to drive the actuators 10 of each wing 6 independently. In that event, a respective clutch 24 may be provided in each transmission line 14A, 14B. Sensing of an abnormal load condition in one of the actuators 10 could be operative to disconnect the clutch in the transmission line for just the affected transmission line 14A, 14B or in both transmission lines 14A, 14B.

In addition, while a wing tip brake has been illustrated for providing the necessary braking of the actuator system 8 after disengagement of the clutch 24, a completely separate brake may be provided.

What is claimed is:

1. An aircraft actuation system comprising:
   a plurality of actuators;
   a common power drive unit for driving the actuators;
   a transmission line transmitting drive from the common drive unit to the plurality of actuators;
   a plurality of movable surfaces, the movable surfaces being moved by the plurality of actuators;
   a transmission line clutch arranged in the transmission line between the power drive unit and the plurality of actuators for selectively disconnecting the power drive unit from the plurality of actuators comprising an output shaft coupled to the transmission line and a movable output shaft plate coupled to the output shaft;
   at least one sensor for sensing an abnormal load condition in the actuation system;
   a clutch control, the at least one sensor being operatively coupled to the clutch control, the clutch control being configured such that when the at least one sensor senses an abnormal load condition, the clutch control is operative to disengage the transmission line clutch so as to disconnect the power drive unit from the plurality of actuators;
   an output shaft brake operative to automatically brake the actuators upon disengagement of the transmission line clutch; and
   wherein the transmission line clutch also comprises the output shaft brake integrated into the transmission line clutch, and automatic operation of braking is affected by means of the output shaft brake integrated into the transmission line clutch such that the output shaft brake is automatically operated upon disengagement of the transmission line clutch, and
   wherein the movable output shaft plate of the transmission line clutch moving into engagement with the output shaft brake to automatically affect braking such that the output shaft brake is automatically operated upon disengagement of the transmission line clutch.

2. The aircraft actuation system as claimed in claim 1, wherein the abnormal load condition is a jam condition in the actuation system.

3. The aircraft actuation system as claimed in claim 1, wherein the at least one sensor is configured to sense one or more of: a system load, a system torque, a system speed and a system position.

4. The aircraft actuation system as claimed in claim 1, wherein at least one sensor is associated with each actuator.

5. The aircraft actuation system as claimed in claim 4, wherein the at least one sensor is configured to sense at least one of an actuator load, actuator torque, actuator speed or actuator position.

6. The aircraft actuation system as claimed in claim 1, wherein the clutch control is further configured to actuate the brake upon the at least one sensor sensing the abnormal load condition.

7. An aircraft actuation system as claimed in claim 1, comprising respective movable surfaces arranged on respective wings of the aircraft with respective sections of the transmission line connected between the power drive unit and the actuators in each wing, and further comprising a wing tip brake on each section of the transmission line.

8. An aircraft actuation system as claimed in claim 7, wherein the wing tip brake is also operable in response to detection by asymmetry detectors on each transmission line section of asymmetrical deployment of the movable surfaces.

9. An aircraft actuation system comprising:
a plurality of actuators;
a common power drive unit for driving the actuators;
a transmission line transmitting drive from the common drive unit to the plurality of actuators;
a plurality of movable surfaces, the movable surfaces being moved by the plurality of actuators;
a transmission line clutch arranged in the transmission line between the power drive unit and the plurality of actuators for selectively disconnecting the power drive unit from the plurality of actuators comprising an output shaft coupled to the transmission line and a movable output shaft plate coupled to the output shaft;
at least one sensor for sensing an abnormal load condition in the actuation system, the sensor being positioned on the transmission line;
a clutch control, the at least one sensor being operatively coupled to the clutch control, the clutch control being configured such that when the at least one sensor senses an abnormal load condition, the clutch control is operative to disengage the transmission line clutch so as to disconnect the power drive unit from the plurality of actuators;
an output shaft brake operative to automatically brake the actuators upon disengagement of the transmission line clutch; and
wherein the transmission line clutch also comprises the output shaft brake integrated into the transmission line clutch, and automatic operation of braking is affected by means of the output shaft brake integrated into the transmission line clutch such that the output shaft brake is automatically operated upon disengagement of the transmission line clutch, and
wherein the movable output shaft plate of the transmission line clutch moving into engagement with the output shaft brake to automatically affect braking such that the output shaft brake is automatically operated upon disengagement of the transmission line clutch.

10. An aircraft actuation system comprising:
a plurality of actuators;
a plurality of movable surfaces, the movable surfaces being moved by the plurality of actuators, wherein respective movable surfaces are arranged on respective wings of the aircraft;
a common power drive unit for driving the actuators;
a transmission line transmitting drive from the common drive unit to the plurality of actuators, wherein respective sections of the transmission line are connected between the power drive unit and the actuators in each wing;
a transmission line clutch arranged in the transmission line between the power drive unit and the plurality of actuators for selectively disconnecting the power drive unit from the plurality of actuators comprising an output shaft coupled to the transmission line and a movable output shaft plate coupled to the output shaft;
at least one sensor on each transmission line section for sensing an abnormal load condition in the actuation system;
a clutch control, the at least one sensor being operatively coupled to the clutch control, the clutch control being configured such that when the at least one sensor senses an abnormal load condition, the clutch control is operative to disengage the transmission line clutch so as to disconnect the power drive unit from the plurality of actuators;
an output shaft brake operative to automatically brake the actuators upon disengagement of the transmission line clutch; and
wherein the transmission line clutch also comprises the output shaft brake integrated into the transmission line clutch, and automatic operation of braking is affected by means of the output shaft brake integrated into the transmission line clutch such that the output shaft brake is automatically operated upon disengagement of the transmission line clutch, and
wherein the movable output shaft plate of the transmission line clutch moving into engagement with the output shaft brake to automatically affect braking such that the output shaft brake is automatically operated upon disengagement of the transmission line clutch
wherein the sensors are asymmetry sensors, the output shaft brake being operative in response to detection by the asymmetry sensors of asymmetrical deployment of the movable surfaces.

* * * * *